Figures 1, 2:
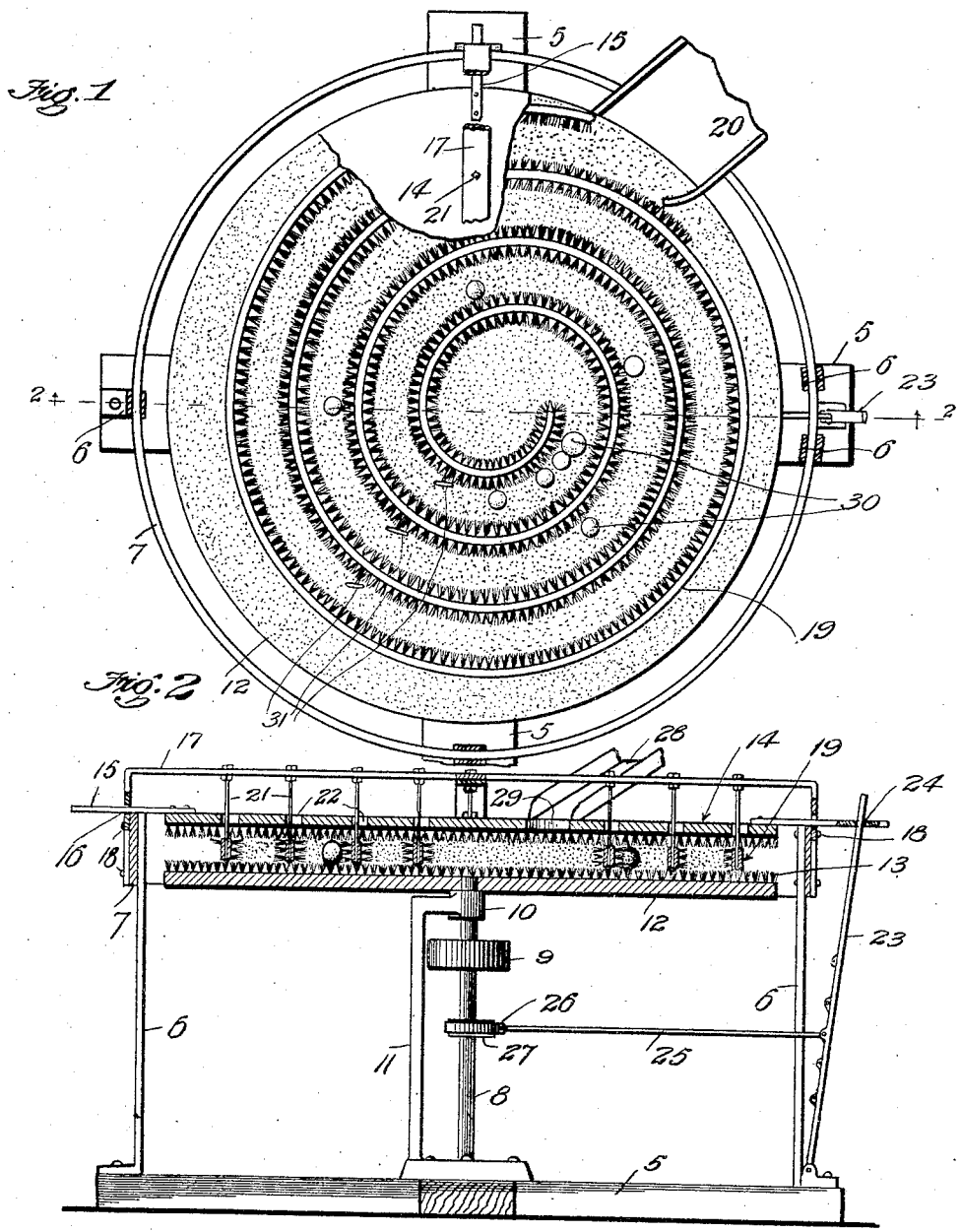

No. 846,160. PATENTED MAR. 5, 1907.
T. STRAIN.
FRUIT BRUSHING MACHINE.
APPLICATION FILED DEC. 4, 1905.

Witnesses
Inventor
Thomas Strain
By Hazard & Harpham
Attorneys.

UNITED STATES PATENT OFFICE.

THOMAS STRAIN, OF NEAR FULLERTON, CALIFORNIA.

FRUIT-BRUSHING MACHINE.

No. 846,160.  Specification of Letters Patent.  Patented March 5, 1907.

Application filed December 4, 1905. Serial No. 290,287.

*To all whom it may concern:*

Be it known that I, THOMAS STRAIN, a citizen of the United States, residing near Fullerton, in the county of Orange and State of California, have invented new and useful Improvements in Fruit-Brushing Machines, of which the following is a specification.

It is the object of my invention to produce a machine for brushing the outside of fruit to remove the dirt therefrom, of compact form and of great capacity, and which will separate the pieces of fruit as they pass through the machine, so that one piece of fruit will not rub against another while being brushed, and which will brush all parts of the fruit. I accomplish these objects by means of the machine described herein and illustrated in the accompanying drawings, in which—

Figure 1 is a plan of my machine with the top brush partly broken away. Fig. 2 is a section on the line 2 2 of Fig. 1.

In the drawings, 5 are the base-timbers of my machine, which are preferably the form of a cross. At the ends of the base-timbers are secured the upright standards 6, which support a casing 7 at the top thereof. At the center of the base is mounted the vertical operating-shaft 8, which is provided with a driving-pulley 9, to which power is applied to rotate the shaft. This shaft passes through a bearing 10, secured to standard 11, rigidly secured to the base-timbers. On the top of the shaft 8 is a circular brush 12, whose upper face is covered with bristles 13, which brush I will call the "bottom brush." Above the bottom brush and separated therefrom, if desired, may be placed the top brush 14, whose under side is covered with bristles. This brush is supported and held in its elevated position by supporting-bars 15, which rest upon the standards 6 and pass out through holes 16 in the top frame 17. This top frame preferably consists of metallic bars at right angles to each other, which are secured to the casing and to the standards by bolts 18. To this top frame is secured the conchoidal brush 19, which is provided with bristles on both sides thereof to the point of exit of the fruit from the machine at the delivery-spout 20, bolts 21, secured to the top frame and to the brush, being provided for that purpose. These bolts pass through slots 22 in the top brush, which slots are long enough to permit the top brush to have a reciprocatory motion, if desired, so that the fruit in contact therewith may be caused to roll on the bottom brush and to shift its relative position thereto. This reciprocatory motion is given to the top brush by means of the pivoted lever 23, which is pivoted to the base and passes through a slot 24 in one of the supporting-bars. A rod 25 is pivotally connected to lever 23 and to the eccentric-strap 26, which passes around eccentric 27, secured to the operating-shaft.

In the operation of my brusher power is applied to rotate the operating-shaft, thereby rotating the bottom brush and causing the top brush to have a slight reciprocatory motion. The fruit is fed into the feeding-spout 28 and passes through an aperture 29 in the top brush and lands upon the bottom brush at the beginning of the conchoidal brush near the center thereof. The conchoidal brush is preferably set eccentric to the center of the bottom brush, and if the bottom brush is rotating slowly it will cause the fruit to hug what may be called the "outside" of the conchoidal brush, as illustrated by the fruit 30 in the drawings. If, however, the bottom brush is driven at a high rate of speed, the fruit will travel against the other side of the brush, being thrown there by centrifugal force. I prefer a slow motion to a fast one. By making the conchoidal brush of a height a little less than the diameter of the smallest piece of fruit to be brushed the fruit as it passes through the machine will be brushed on all sides by the different brushes, as the reciprocatory motion of the top brush will change the position of the fruit very frequently with reference to the different brushes. By changing the point of attachment of rod 25 to lever 23 and by sliding the eccentric up or down the operating-shaft a greater or less reciprocatory motion may be given to the top brush. In some cases it may be desirable to omit the top brush. However, I prefer its use; but where expense is an object it may be omitted, as the brusher works very well without it. When the top brush is omitted, it may be desirable to put in rubber deflectors 31 to cause the fruit to change its position on the bottom brush.

By this construction a brusher of very compact form, very efficient, and of great capacity is provided, because the fruit can be carried therethrough very rapidly, its passage therethrough being regulated by the speed of rotation of the bottom brush. It will be observed that the conchoidal brush grows larger toward the outside and that the speed of rotation of the bottom brush is faster as the outer edge is approached, and for that reason the fruit gradually increases its rate of travel through the brusher, thereby separating the different pieces of fruit so that one will not rub against another, which is a very great advantage, as less injury will occur to the fruit than happens when one piece rubs against another as it passes through the brusher.

Having described my invention, what I claim as new, and desire to secure by Letters Patent, is—

1. A fruit-brushing machine comprising a horizontally-rotating bottom brush; a horizontal conchoidal brush above the same and forming with the bottom brush a runway for the passage of the fruit through the machine.

2. A fruit-brushing machine comprising a rotating bottom brush; a stationary top brush above said bottom brush; and a horizontal conchoidal brush intermediate of said top and bottom brushes.

3. A fruit-brushing machine comprising a rotating bottom brush; a top brush above said bottom brush; means to give said top brush a reciprocating motion; and a horizontal conchoidal brush intermediate of said top and bottom brushes.

4. A fruit-brushing machine comprising a flat horizontally-rotating bottom brush; a top brush above said bottom brush; and means to give said top brush a reciprocating motion.

In witness that I claim the foregoing I have hereunto subscribed my name this 25th day of November, 1905.

THOMAS STRAIN.

Witnesses:
G. E. HARPHAM,
HENRY T. HAZARD.